United States Patent [19]

Ara et al.

[11] Patent Number: 4,770,493
[45] Date of Patent: Sep. 13, 1988

[54] HEAT AND RADIATION RESISTANT OPTICAL FIBER

[75] Inventors: Kuniaki Ara; Hiroshi Rindo; Koichiro Nakamoto, all of Mito; Takashi Tsumanuma, Sakura; Sadao Chigira; Kazuo Sanada, both of Chiba; Osamu Fukuda, Sakura, all of Japan

[73] Assignees: Doroyokuro Kakunenryo Kaihatsu Jigyodan; Fujikura Ltd., both of Tokyo, Japan

[21] Appl. No.: 833,318

[22] Filed: Feb. 24, 1986

[30] Foreign Application Priority Data

Mar. 7, 1985 [JP] Japan .................................. 60-45288

[51] Int. Cl.⁴ ................................................ G02B 6/16
[52] U.S. Cl. .............................. 350/96.30; 350/96.23; 350/96.33; 350/96.34
[58] Field of Search ............... 350/96.11, 96.12, 96.13, 350/96.15, 96.20, 96.29, 96.30, 96.33, 96.34, 96.23

[56] References Cited

U.S. PATENT DOCUMENTS

| | | | |
|---|---|---|---|
| 4,511,209 | 4/1985 | Skutnik | 350/96.34 |
| 4,523,804 | 6/1985 | Thompson | 350/96.23 |
| 4,593,970 | 6/1986 | Rhodes | 350/96.20 |
| 4,632,506 | 12/1986 | Taylor | 350/96.23 |
| 4,696,542 | 9/1987 | Thompson | 350/96.23 |

Primary Examiner—John Lee
Attorney, Agent, or Firm—Sprung Horn Kramer & Woods

[57] ABSTRACT

An optical fiber includes light-transmitting means comprising at least one optical fiber element, and a heat-resistant and radiation-resistant coating formed around the light-transmitting means. The coating comprises an inner buffer layer formed around the light-transmitting means and an outer layer of polyether ether ketone formed around the inner layer.

5 Claims, 2 Drawing Sheets

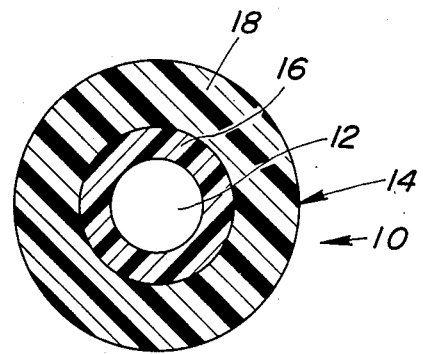
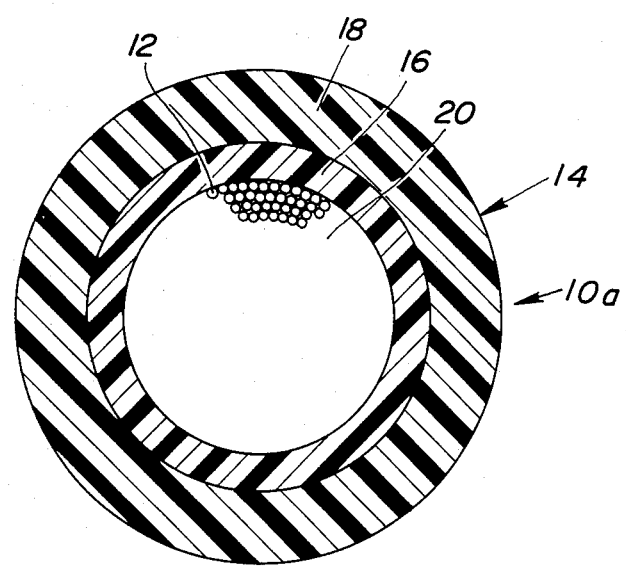

HEAT AND RADIATION RESISTANT OPTICAL FIBER

BACKGROUND OF THE INVENTION

1. Field of the Invention

This invention relates to a heat and radiation-resistant optical fiber.

2. Prior Art

As is well known in the art, optical fibers have now been extensively used for communication, image-transmitting and illumination purposes, and such optical fibers comprise at least one optical fiber element for transmitting light which element is made of a glass material such as multi-component glass and silica glass. Those optical fibers comprising at least two optical fiber elements are often referred to as "multiple fiber" in the trade. The optical fiber element has a protective coating formed on its surface. Without such a coating, a fine defect or damage present on the surface of the optical fiber element would grow to such a size that the mechanical strength of the fiber element is finally reduced below an acceptable level. Such a coating will also increase tensile strength and bending strength and enhance an environmental resistance. Various such coatings have heretofore been proposed. However, such coatings are soon deteriorated when the optical fibers are installed in a nuclear reactor since the coatings fail to offer sufficient resistance to intense heat and radioactivity. As a result, the mechanical strength of the optical fibers is reduced, and the fiber is finally subjected to rupture.

It has therefore been proposed to apply a multi-layer coating to the optical fiber element or elements to provide an optical fiber for use in a severe environment such as in a nuclear reactor. This procedure has been found disadvantageous, however, in that the resultant optical fiber is rendered less flexible because of the provision of the multi-layer coating, so that such an optical fiber can not be easily handled and installed.

To overcome this difficulty, it has also been proposed to apply a coating of a fluorine-based resin, such as FEP, TFE, TETZEL and KF, onto an optical fiber element or elements through an inner layer of silicone rubber. This approach has also been found disadvantageous, however, in that when such a coating is subjected to radiation, it produces hydrofluoric acid which tends to corrode the surface of the optical fiber element to reduce its mechanical strength. To eliminate this disadvantage, it has been proposed to use as the inner layer silicone rubber containing metal oxides, but satisfactory effects could not be achieved.

SUMMARY OF THE INVENTION

It is therefore an object of this invention to provide an optical fiber comprising at least one optical fiber element and a coating mounted therearound which coating is excellent in heat resistance and radiation resistance.

According to the present invention, there is provided an optical fiber which comprises light-transmitting means comprising at least one optical fiber element, and a heat-resistant and radiation-resistant coating formed around said light-transmitting means, said coating comprising an inner buffer layer formed around said light-transmitting means and an outer layer of polyether ether ketone formed around said inner layer.

BRIEF DESCRIPTION OF THE DRAWINGS

FIG. 1 is a cross-sectional view of an optical fiber provided in accordance with the present invention;

FIG. 2 is a view similar to FIG. 1 but showing a modified optical fiber, that is, a multiple fiber;

DESCRIPTION OF THE PREFERRED EMBODIMENTS OF THE INVENTION

Figure 3:
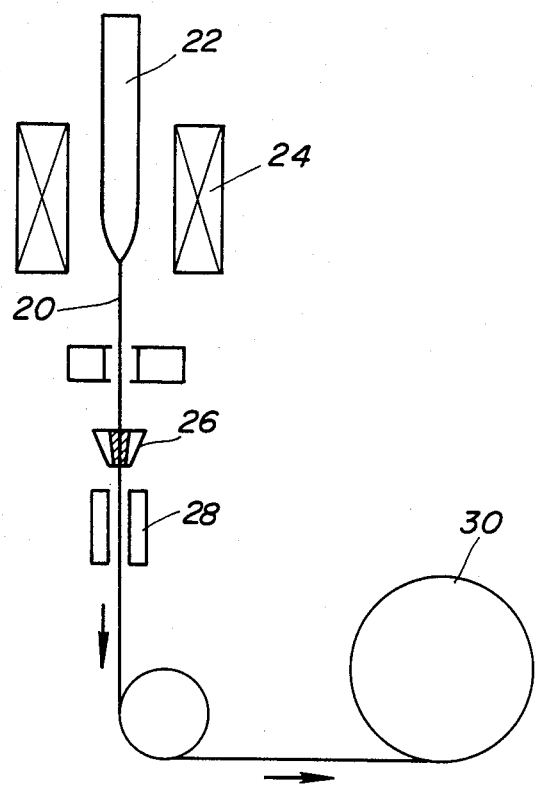
FIG. 3 is a schematic view of a drawing apparatus used for preparing the optical fiber.

The invention will now be described with reference to the drawings in which like reference numerals denote corresponding parts in several views.

FIG. 1 shows an optical fiber 10 for use as a transmission line of optical communication. Fiber 10 comprises an optical fiber element 12 as light-transmitting means and a coating 14 formed around the fiber element 12, the coating 14 being composed of an inner layer 16 formed around the fiber element 12 and an outer layer 18 formed around the inner layer 16. The optical fiber element 12 is formed by drawing an optical fiber preform, made of a glass material such as multi-component glass and silica glass, into a suitable diameter, and light is adapted to be transmitted through the optical fiber element 12 as is well known in the art.

The inner coating layer 16 is made of modified silicone rubber which is relatively soft or resilient and has a greater refractive index than that of silica glass. The modified silicone rubber is made of methyl phenyl silicone rubber which is made from dimethyl silicone rubber in such a manner that a methyl radical is substituted by a phenyl radial. The inner layer 16 serves to increase the mechanical strength of the optical fiber 10 and also serves as a buffer layer to dampen deformation of the optical fiber due to temperature variations and an external stress or force, thereby keeping the loss of the optical fiber to a low level.

For applying the inner coating layer 16, the drawn optical fiber element is passed through a die of a coating applicator to apply a solution of silicone rubber onto an outer peripheral surface thereof soon after the drawing operation so as to prevent any damage to the surface of the drawn fiber element. Then, the fiber element coated with the silicone solution is passed through a crosslinking tube to cure or set the silicone solution to form the inner coating layer 16. The silicone solution is uniformly applied onto the drawn fiber element so that the resultant inner layer 16 usually has a uniform thickness of about 150 to about 200 $\mu$m throughout the entire length of the fiber element. If the thickness of the resultant inner coating layer 16 is less than 100 $\mu$m, the resultant inner coating layer 16 fails to serve as a buffer layer satisfactorily. To further enhance the mechanical strength and buffer effect of the inner coating layer 16, this coating layer may be composed of a first layer of the above-mentioned modified silicone rubber formed on the outer peripheral surface of the optical fiber element 12 and a second layer of silicone rubber formed on the first layer. In this case, the first layer has a thickness of about 40 to about 50 $\mu$m while the second layer has a thickness of about 110 to about 150 $\mu$m.

The inner coating layer 16 serving as a buffer layer can be made of acrylate resin of the ultraviolet crosslinked type such as epoxy acrylate, urethane acrylate, silicone acrylate and polybutadiene acrylate.

The outer coating layer 18 is made of polyether ether ketone (hereinafter referred to as "PEEK") and serves not only to allow the optical fiber to be handled easily but also to enhance environmental resistance of the optical fiber, thereby improving a reliability thereof. For applying the outer coating layer 18 onto the inner coating layer 16, PEEK is melted at a temperature of about 360° C., and the molten PEEK is applied to the inner coating layer 16 by extrusion. Preferably, the thickness of the outer coating layer 18 is 120 to 130 $\mu$m. If this thickness is less than 100 $\mu$m, the outer coating layer 18 is rather poor in heat resistance and radiation resistance. The outer coating layer 18 is made of PEEK which is excellent in heat and radiation resistances, and therefore even if the optical fiber 10 is installed in an environment in which it is subjected to intense heat and radioactivity, the optical fiber 10 is not deteriorated for a prolonged period of time. Therefore, the optical fiber 10 can be used in a severe environment such as in a nuclear reactor without the need for an unduly thick coating, so that the optical fiber 10 can be flexed easily and therefore be handled easily.

FIG. 2 shows a modified optical fiber 10a which is used to transmit an image, this optical fiber 10a being often referred to as "image fiber" in the trade. The optical fiber 10a comprises a multiple-fiber member 20 as light-transmitting means composed of a plurality of optical fiber elements 12 fused together at their outer peripheral surfaces, and a coating 14 formed around an outer peripheral surface of the multiple-fiber member 20. The coating 14 has the same construction as the coating 14 of the preceding embodiment shown in FIG. 1.

EXAMPLE 1

Figure 4:
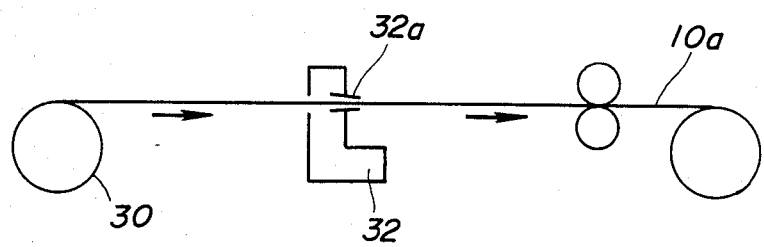
FIG. 4 is a schematic view of an extruder used for producing the optical fiber.

The optical fiber 10a shown in FIG. 2 was prepared using equipment shown in FIGS. 3 and 4. More specifically, first, a plurality of optical fiber elements 12 were inserted into a glass tube to prepare a multiple fiber preform 22 having a diameter of 30 mm. Then, the multiple fiber preform 22 was fed to an electrical resistance heater 24 at a speed of 10 mm/min. and was drawn at a speed of 2 m/min. to form a multiple-fiber member 20. Subsequently, the multiple-fiber member 20 was passed through a die 26 of a coating applicator to apply a solution of modified silicone rubber (sold by Shinetsu Chemical Kabushiki Kaisha, Japan, under the tradename of OF-127) to the multiple-fiber member 20 over an entire peripheral surface thereof to form a coating thereon. Subsequently, the multiple-fiber member 20 coated with the modified silicone rubber solution was passed through a crosslinking tube 28 maintained at a temperature of 450° C., so that the coating was cured to form an inner buffer layer 16. The multiple-fiber member 20 with the inner coating layer 16 was wound around a wind-up drum 30. Then, the multiple-fiber member 20 with the coating layer 16 was fed from the drum 30 to an extrusion coater or extruder 32 and was passed through a crosshead die 32a to form an outer coating layer 18 of PEEK around the inner coating layer 16 to provide an optical fiber 10a. The cylinder of the extruder 32 had an inner diameter of 30 mm, and the crosshead die 32a was maintained at a temperature of 360° C. The optical fiber 10a thus produced had an outer diameter of 40 mm, and the multiple-fiber member 12 had an outer diameter of 2 mm, and the multiple-fiber member 20 with the inner coating layer 16 had an outer diameter of 2.4 mm. The TABLE below indicates physical properties of PEEK.

A comparative optical fiber was also prepared according to the above procedure except that an outer coating layer was made of FEP. Each of the optical fiber 10a and the comparative optical fiber was placed in a heating device and was subjected to a heating test for 50 hours at a temperature of 200° C. Then, the appearance of each optical fiber was observed. It was observed that the outer coating layer of the comparative optical fiber was deteriorated while the outer coating layer 18 of the optical fiber 10a was not deteriorated.

A hundred samples of the optical fiber 10a subjected to the above heating test and another hundred samples of the optical fiber 10a not subjected to the above heating test were subjected for a tensile break strength test. Similarly, a hundred samples of the comparative optical fibers subjected to the above heating test and another hundred of the comparative optical fibers not subjected to the above heating test were also subjected to the same tensile break strength test. In the tensile break strength test, the opposite ends of each sample were held respectively by a pair of chucks spaced from each other a distance of 10 m, and one of the chucks was pulled at a speed of 50 cm/min. And, the probability of breaking or rupture was determined by Weibull distribution. With respect to the optical fiber 10a not subjected to the above heating test, a probability line in a Weibull distribution graph rose abruptly at a breaking load of 1800 to 2000 kg while a probability line with respect to the optical fiber 10a subjected to the above heating test rose abruptly at a breaking load of 1750 to 1950 kg. With respect to the comparative optical fiber not subjected to the above heating test, a probability line rose abruptly at a breaking load of 1700 to 2000 kg while a probability line with respect to the comparative optical fiber subjected to the above heating test rose abruptly at a breaking load of 1400 to 1800 kg. Thus, the optical fiber 10a according to the present invention had an excellent heat resistance.

TABLE

| | Properties | PEEK |
|---|---|---|
| | Specific gravity (g/cc) | 1300 |
| Mechanical properties | Tensile strength (kg/cm$^2$) | 930 |
| | Bending modulus (kg/cm$^2$) | 4 × 10$^4$ |
| | Izod impact strength (notched) (kg · cm/cm) | 45 |
| | Elongation (%) | 150 |
| Thermal properties | Melting point (°C.) | 334 |
| | Glassy-transition temperature (°C.) | 143 |
| | Heat distortion temperature (°C.) | 152 |
| | UL temperature index (°C.) | (240) |
| Electrical properties | Dielectric constant (10 Hz) | 3.4 |
| | Dielectric dissipation factor (10 Hz) | 0.003 |
| | Dielectric breakdown voltage (KV/mm) | 17 |
| | Flame retardancy | UL94V-0 |

EXAMPLE 2

For determining radiation effects, each of an optical fiber 10a and a comparative optical fiber, prepared according to the procedures of EXAMPLE 1 was subjected to gamma radiation at room temperatures for 1000 hours in an atmosphere of the air, each optical fiber being spaced from a cobalt-60 gamma source of $10^4$ Ci (curies) a distance of 5 m. Then, the optical fiber 10a and the comparative optical fiber were subjected to a heating test according to the procedure of EXAMPLE 1. Then, it was observed that the appearance of the optical fiber 10a was not deteriorated at all. Then, according to the procedure of EXAMPLE 1, a hundred samples of the optical fiber 10a and a hundred of the comparative optical fiber were tested for a tensile break strength, and the probability of breaking or rupture was determined by Weibull distribution. With respect to the optical fiber 10a, a probability line in a Weibull distribution graph rose abruptly at a breaking load of 1700 to 2000 kg while a probability line with respect to the comparative optical fiber rose abruptly at a breaking load of 1500 to 1900 kg. Thus, the optical fiber 10a according to the present invention had an excellent radiation-resistance.

What is claimed is:

1. An optical fiber comprising light-transmitting means comprising at least one optical fiber element, and a heat-resistant and radiation-resistant coating formed around said light transmitting means, said coating comprising an inner buffer layer composed of acrylate resin of the ultraviolet crosslinked type formed around said light transmitting means and an outer layer of polyether ether ketone formed around said inner layer.

2. An optical fiber according to claim 1, wherein said inner buffer layer is composed of one selected from the group consisting of epoxy acrylate, urethane acrylate, silicone acrylate and polybutadiene acrylate.

3. An optical fiber according to claim 1, in which said light-transmitting means comprises a plurality of optical fiber elements fused together at their outer peripheries.

4. An optical fiber according to claim 1, in which said inner layer has a thickness of about 150 to about 200 μm.

5. An optical fiber according to claim 1, in which said outer layer has a thickness of about 120 to about 130 μm.

* * * * *

UNITED STATES PATENT AND TRADEMARK OFFICE
CERTIFICATE OF CORRECTION

PATENT NO. : 4,770,493

DATED : September 13, 1988

INVENTOR(S) : Kuniaki Ara, et al

It is certified that error appears in the above-identified patent and that said Letters Patent is hereby corrected as shown below:

Title Page, after "[73] Assignees:"   Delete "Doroyokuro" and substitute --Doryokuro--

Signed and Sealed this

Thirty-first Day of October, 1989

Attest:

DONALD J. QUIGG

Attesting Officer   Commissioner of Patents and Trademarks